(No Model.) 3 Sheets—Sheet 1.
J. F. TROUT.
WATER URN FOR COOKING PURPOSES.
No. 326,529. Patented Sept. 15, 1885.
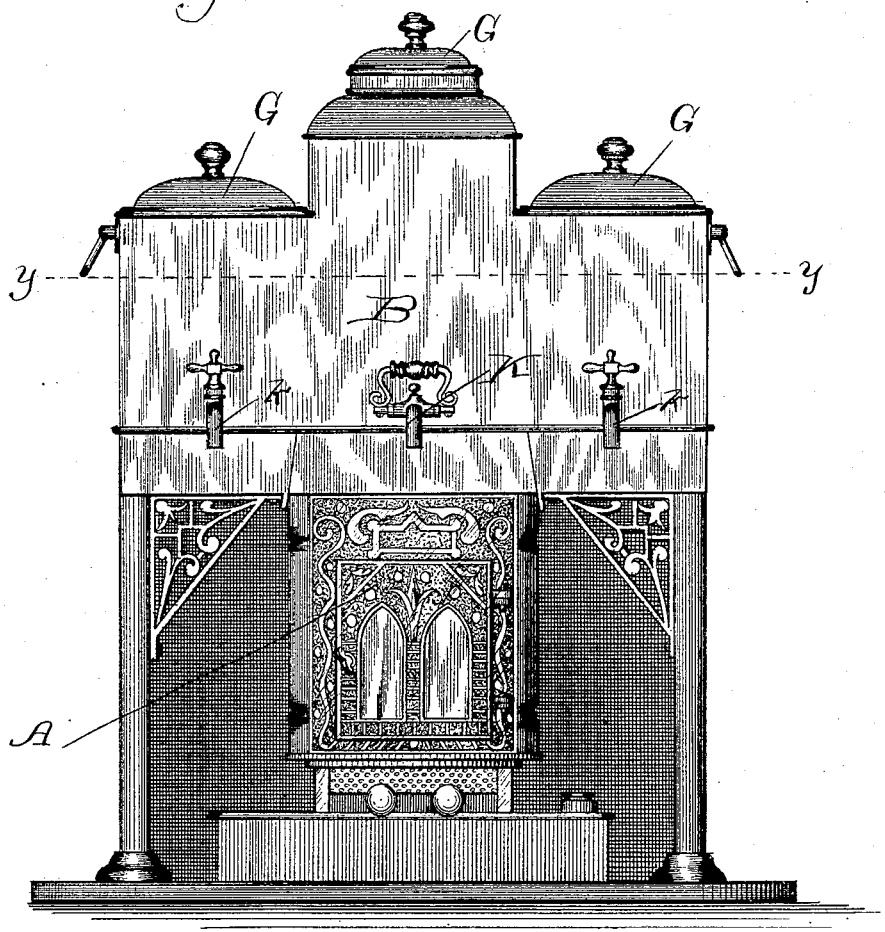

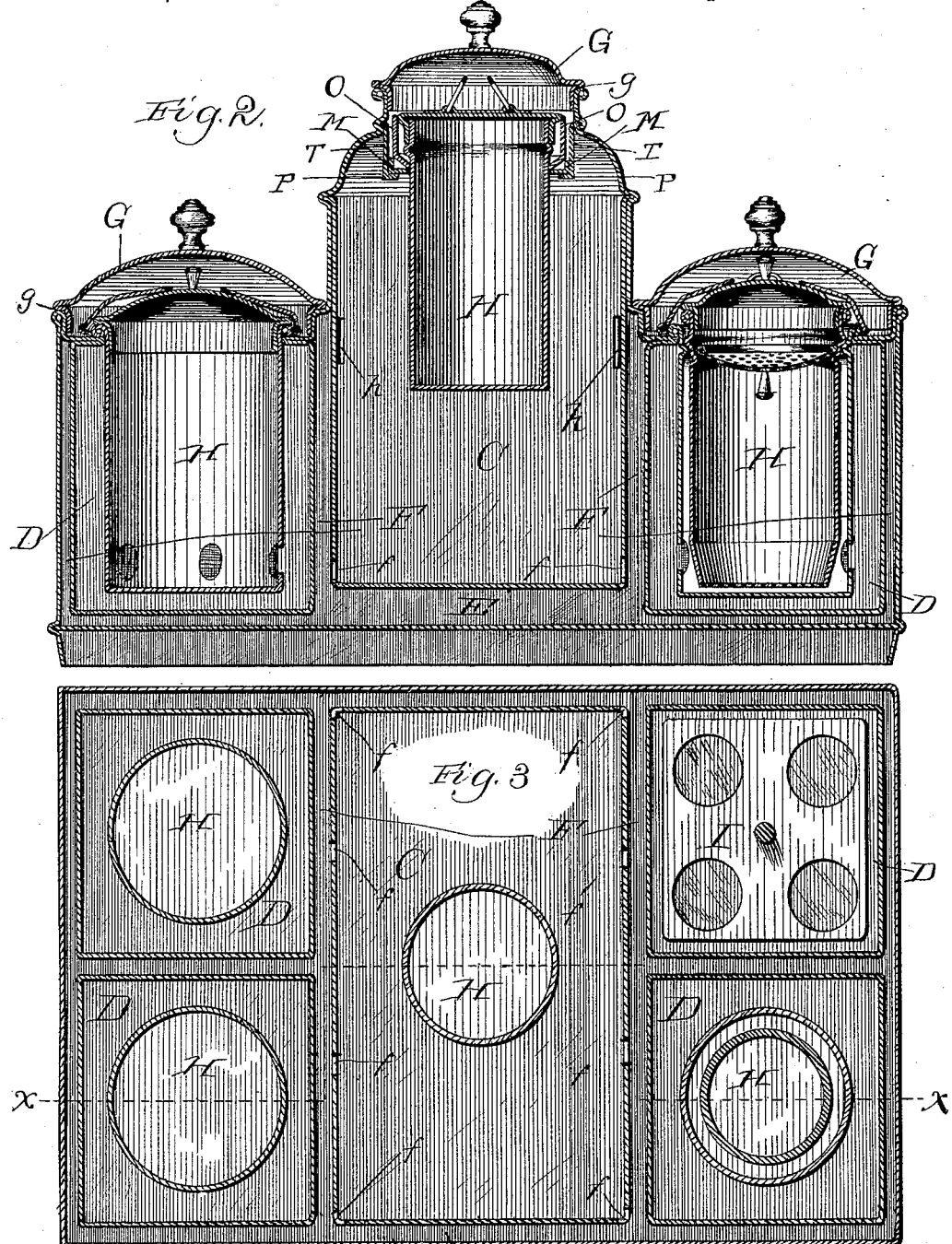

(No Model.) 3 Sheets—Sheet 3.
J. F. TROUT.
WATER URN FOR COOKING PURPOSES.
No. 326,529. Patented Sept. 15, 1885.
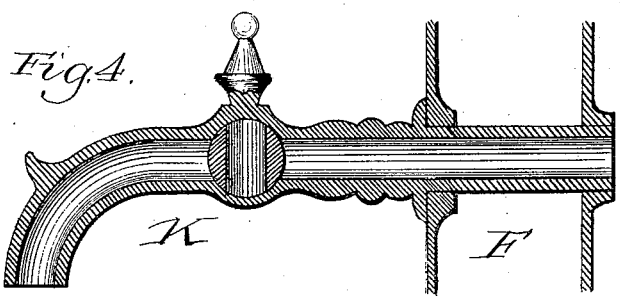
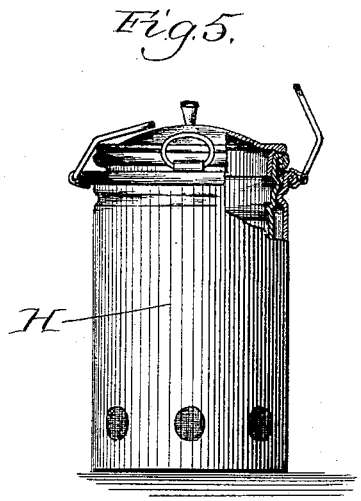
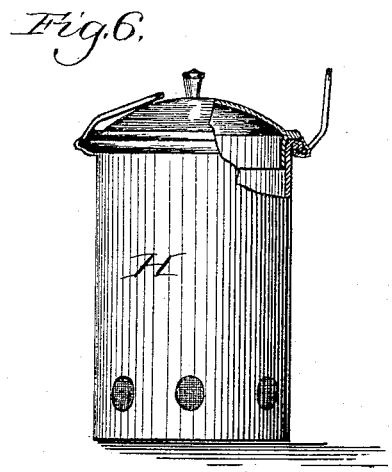
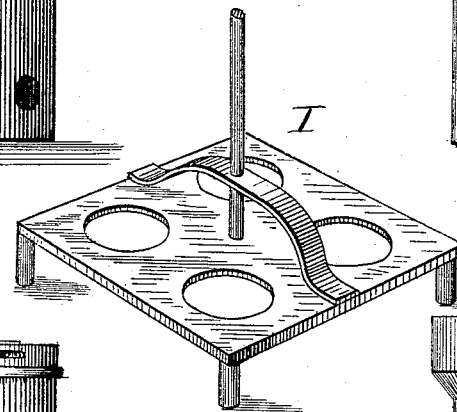
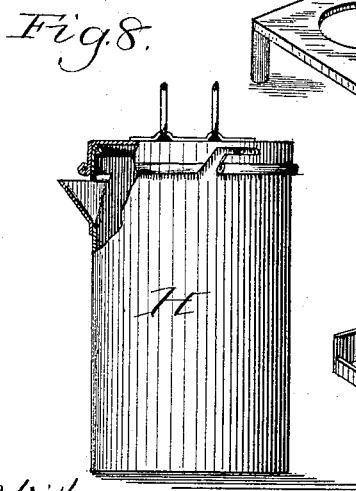
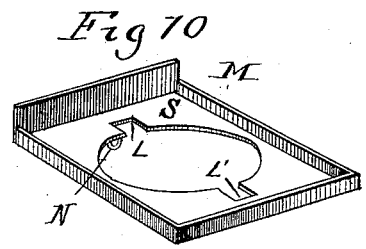
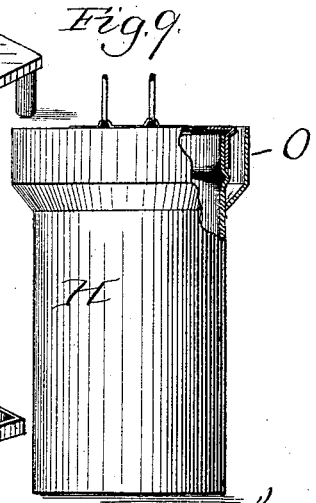
Witnesses:
Chas. E. Gaylord.
Frederick H. Goodwin
Inventor:
John F. Trout
By Offield & Towle,
Attorneys.

UNITED STATES PATENT OFFICE.

JOHN F. TROUT, OF CHICAGO, ILLINOIS.

WATER-URN FOR COOKING PURPOSES.

SPECIFICATION forming part of Letters Patent No. 326,529, dated September 15, 1885.

Application filed July 7, 1884. (No model.)

*To all whom it may concern:*

Be it known that I, JOHN F. TROUT, a citizen of the United States, residing at Chicago, in the county of Cook and State of Illinois, have invented a certain new and useful Improvement in Water-Urns for Cooking Purposes, of which the following is a full, clear, and exact description, reference being had to the accompanying drawings.

My invention relates to a peculiar construction of urn to be used principally upon railroad-cars for the purpose of furnishing a light meal or lunch to passengers by means of a circulation of hot and boiling water, and of a detailed construction of the same to prevent the displacement of the water by the agitation of travel, the principal articles to be cooked in said urn being eggs, tea, coffee, oysters, and chocolate, and the urn to be preferably heated or acted upon by the ordinary kerosene oil-stove now in use.

It consists of a large vessel or combined compartments to form such vessel, of any convenient shape; but I find that the rectangular form gives the best satisfaction in actual use, divided as follows: One principal or main-compartment tank to contain water is placed preferably as a central section of the urn or vessel, with small holes or openings at or near its bottom sides or edges. Adjoining this main tank are four other and smaller compartments or tanks, and these tanks are separated from each other and from the main tank by spaces of about one-half inch width, which surround them except as to their upper or top portions, the main tank having openings a short distance below its top communicating with these adjacent and surrounding spaces between the compartments. Underneath the main compartment or tank, and extending beneath the other compartments or tanks, is a space of about one-half inch in depth. In the several compartments are placed small movable boilers or vessels, which contain the desired articles to be boiled or cooked, principally as heretofore mentioned.

The object of my invention is to combine in one and the same vessel or urn the several distinct compartments for cooking purposes, and heat the same under ordinary circumstances by the flame of one wick-piece of an oil-stove, and cook the respective and desired contents thereof by heating and circulating hot water around said several compartments, and preventing a displacement of the water by the violent agitation of travel.

In the drawings, Figure 1 is an elevation of my improved urn as shown in connection with the stove. Fig. 2 is a vertical sectional view of my urn on lines $x$ $x$ of Fig. 3. Fig. 3 is a horizontal sectional view of my urn on lines $y$ $y$ of Fig. 1. Fig. 4 is a sectional view of my drawing-off faucet for the main tank. Figs. 5, 6, 7, 8, and 9 are detail views of boilers to be used in my invention. Fig. 10 is a perspective view of my improved water-brake.

Like letters refer to like parts throughout the several views.

A is the stove by which the urn is heated. B is the urn entire. C is the main tank or compartment. D D D D are adjacent compartments. E is the space beneath the main and adjacent tanks. F F are the spaces surrounding the several compartments or small tanks. $fffff$ are the holes or openings at the bottom or edge of the main tank, from which the water escapes into the space E and rises into the spaces F F. $h\ h\ h\ h$ are the openings connecting the spaces F F and tank C. G G are the lids to cover the openings $g\ g$ into the several compartments or tanks. H H are the boilers, which set into the several tanks or compartments. I is an egg-rack, to be used in one of the tanks. K K are faucets connecting with the large tank, and $k\ k$ are faucets connecting with the small compartments, as desired. M is a detailed view of my water-brake.

The products desired to be cooked are placed in the boilers, which are then placed in their respective compartments and covered. Water is then placed in the main tank and at once passes through the holes $ff$ into the space E, and rises into the spaces F F in proportion as the water is placed in the main tank. It will readily be seen that only a small depth of water is subject to the action of the heat or flame at one time, and this small quantity of water is very quickly heated and at once passes up into the spaces F F, surrounding the different compartments or tanks, and when the heat is sufficient is forced out through the openings h h and again into the main tank C, and this circulation continuously exists until the cooking is accomplished, all the food-products being cooked by the circulation of the water instead of by the direct action of the flame.

This manner of cooking by the above devices prevents any possibility of scorching or burning the food-products, and enables the unskilled or careless porter or employé upon sleeping or hotel cars or any other surroundings to furnish quickly, perfectly cooked, a palatable food without risk or danger of spoiling the same, which cannot be accomplished practically by any other now known devices under the same circumstances.

I have found that great difficulty arises in keeping the water in the main tank under violent motion of the cars in railway travel, the force of movement of the cars often being so violent as to throw off the lid of the main tank and project the water and contents of the tank to the ceiling of the car. To obviate this I have provided the water-brake M at the mouth of the tank, which completely prevents the escape of the water or any displacement of the contents of the tank under the most violent motion of travel. This water brake M is of the form shown in Fig. 10. It consists of a bottom plate, S, having a central circular aperture, through which passes the body of the cooking-vessel H, Fig. 9. The said vessel is provided with an annular gutter, O, soldered to the exterior surface thereof and adapted to receive any overflow from the said vessel. The lower beveled edge of this gutter rests upon the bounding-edges of the opening in the plate S, forming close contact therewith.

When the vessel is inserted in the opening, as shown in Fig. 2, it is prevented from being thrown out by means of two diametrically-opposite lugs upon its exterior surface below the gutter O, said lugs, as the vessel is being inserted, passing through the openings L L' until the lugs are below the plate, whereupon the vessel is rotated until they engage beneath the plate. This motion of rotation is limited by studs diametrically opposite each other, one of which, N, is shown in Fig. 10.

The brake M has upwardly-projecting flanges, having a slight outward inclination, too small to be represented in the drawings. It fits snugly within the depending rectangular pocket T, soldered to the top of the main compartment, as shown, and rests upon the interior flange P of said pocket.

Having thus described my invention, what I claim, and desire to secure by Letters Patent, is—

1. The combination, with the urn B, of the central water-supply tank, C, provided with bottom openings, $f\,f$, and top openings, $h\,h$, and separated from the bottom of the urn by an intervening space and the series of adjacent tanks D D, the several tanks being separated from each other by spaces or passages communicating with each other and with the space beneath the main tank, substantially as shown and described.

2. The combination, with the urn B and vessel H, of the water-brake M, within which such vessel is detachably secured, the urn being provided with a depending pocket, T, within which the brake M fits closely, substantially as shown and described.

JOHN F. TROUT.

Witnesses:
FREDERICK C. GOODWIN,
B. B. BOYNTON.